(12) United States Patent
Batley et al.

(10) Patent No.: US 10,402,203 B2
(45) Date of Patent: Sep. 3, 2019

(54) DETERMINING A PREDICTED BEHAVIOUR FOR PROCESSING OF INSTRUCTIONS

(71) Applicant: ARM LIMITED, Cambridge (GB)

(72) Inventors: Max John Batley, Cottenham (GB); Simon John Craske, Cambridge (GB); Ian Michael Caulfield, Cambridge (GB); Peter Richard Greenhalgh, Cambridge (GB); Allan John Skillman, Kettering (GB); Antony John Penton, Little Canfield (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/578,477

(22) PCT Filed: Mar. 31, 2016

(86) PCT No.: PCT/GB2016/050908
§ 371 (c)(1),
(2) Date: Nov. 30, 2017

(87) PCT Pub. No.: WO2016/193654
PCT Pub. Date: Dec. 8, 2016

(65) Prior Publication Data
US 2018/0173535 A1 Jun. 21, 2018

(30) Foreign Application Priority Data
Jun. 5, 2015 (GB) .................................. 1509738.9

(51) Int. Cl.
*G06F 9/30* (2018.01)
*G06F 9/38* (2018.01)

(52) U.S. Cl.
CPC ........ *G06F 9/3885* (2013.01); *G06F 9/30189* (2013.01); *G06F 9/3804* (2013.01)

(58) Field of Classification Search
None
See application file for complete search history.

(56) References Cited

U.S. PATENT DOCUMENTS 5,335,331 A * 8/1994 Murao ................ G06F 9/30185
712/213
7,779,213 B2 * 8/2010 Ferren ...................... G06F 9/50
711/154

(Continued)

OTHER PUBLICATIONS

Balasubramonian et al.; Memory Hierarchy Reconfiguration for Energy and Performance in General-Purpose Processor Architectures; IEEE; 2000.*

(Continued)

*Primary Examiner* — Corey S Faherty
(74) *Attorney, Agent, or Firm* — Nixon & Vanderhye, P.C.

(57) ABSTRACT

An apparatus comprises prediction circuitry (40, 100, 80) for determining, based on current prediction policy information (43, 82, 104), a predicted behavior to be used for processing instructions. The current prediction policy information is updated based on an outcome of processing of instructions. A storage structure (50) stores at least one entry identifying previous prediction policy information (60) for a corresponding block of instructions. In response to an instruction from a block having a corresponding entry in the storage structure (50) which identifies the previous prediction policy information (60), the current prediction policy information (43, 82, 104) can be reset based on the previous prediction policy information 60 identified in the corresponding entry of the storage structure (50).

19 Claims, 5 Drawing Sheets

(56) References Cited

U.S. PATENT DOCUMENTS

2005/0102560 A1    5/2005   Taketoshi et al.
2012/0005462 A1    1/2012   Hall et al.
2013/0283023 A1   10/2013   Tabony et al.

OTHER PUBLICATIONS

International Search Report and Written Opinion of the ISA for PCT/GB2016/050908, dated Jul. 4, 2016, 10 pages.
Search and Examination Report for GB1509738.9, dated Oct. 5, 2017, 5 pages.

\* cited by examiner

DETERMINING A PREDICTED BEHAVIOUR FOR PROCESSING OF INSTRUCTIONS

This application is the U.S. national phase of International Application No. PCT/GB2016/050908 filed 31 Mar. 2016, which designated the U.S. and claims priority to GB Patent Application No. 1509738.9 filed 5 Jun. 2015, the entire contents of each of which are hereby incorporated by reference.

The present technique relates to the field of data processing. More particularly, it relates to an apparatus or method with a mechanism for predicting a behaviour to be used when processing instructions.

A data processing apparatus may have a prediction mechanism for predicting a predicted behaviour to be used when processing instructions. For example, a branch predictor may predict the outcome of branch instructions and control fetching of subsequent instructions depending on whether the branch is predicted taken or not taken.

At least some examples provide an apparatus comprising:
processing circuitry to process instructions;
prediction circuitry to determine, in dependence on current prediction policy information, a predicted behaviour to be used when processing instructions, and to update the current prediction policy information based on an outcome of processing of instructions by the processing circuitry; and
a storage structure to store at least one entry identifying previous prediction policy information for a corresponding block of instructions;
wherein in response to an instruction from a block of instructions for which the storage structure stores a corresponding entry identifying the previous prediction policy information, the prediction circuitry is configured to reset the current prediction policy information based on the previous prediction policy information identified in the corresponding entry of the storage structure.

At least some examples provide an apparatus comprising:
means for processing instructions;
means for determining, in dependence on current prediction policy information, a predicted behaviour to be used when processing instructions, and updating the current prediction policy information based on an outcome of processing of instructions by the processing circuitry; and
means for storing at least one entry identifying previous prediction policy information for a corresponding block of instructions;
wherein in response to an instruction from a block of instructions for which the means for storing stores a corresponding entry identifying the previous prediction policy information, the means for determining is configured to reset the current prediction policy information based on the previous prediction policy information identified in the corresponding entry of the means for storing.

At least some examples provide a method comprising:
determining, in dependence on current prediction policy information, a predicted behaviour to be used when processing instructions;
updating the current prediction policy information based on an outcome of processing of instructions by the processing circuitry;
storing in a storage structure at least one entry identifying previous prediction policy information for a corresponding block of instructions; and
in response to an instruction from a block of instructions for which the storage structure stores a corresponding entry identifying the previous prediction policy information, resetting the current prediction policy information based on the previous prediction policy information identified in the corresponding entry of the storage structure.

Further aspects, features and advantages of the present technique will be apparent from the following description of examples, which is to be read in conjunction with the accompanying drawings, in which:

FIG. 1 schematically illustrates an example an apparatus having prediction circuitry for predicting which of a plurality of processing modes to use for processing instructions;

Figure 1:
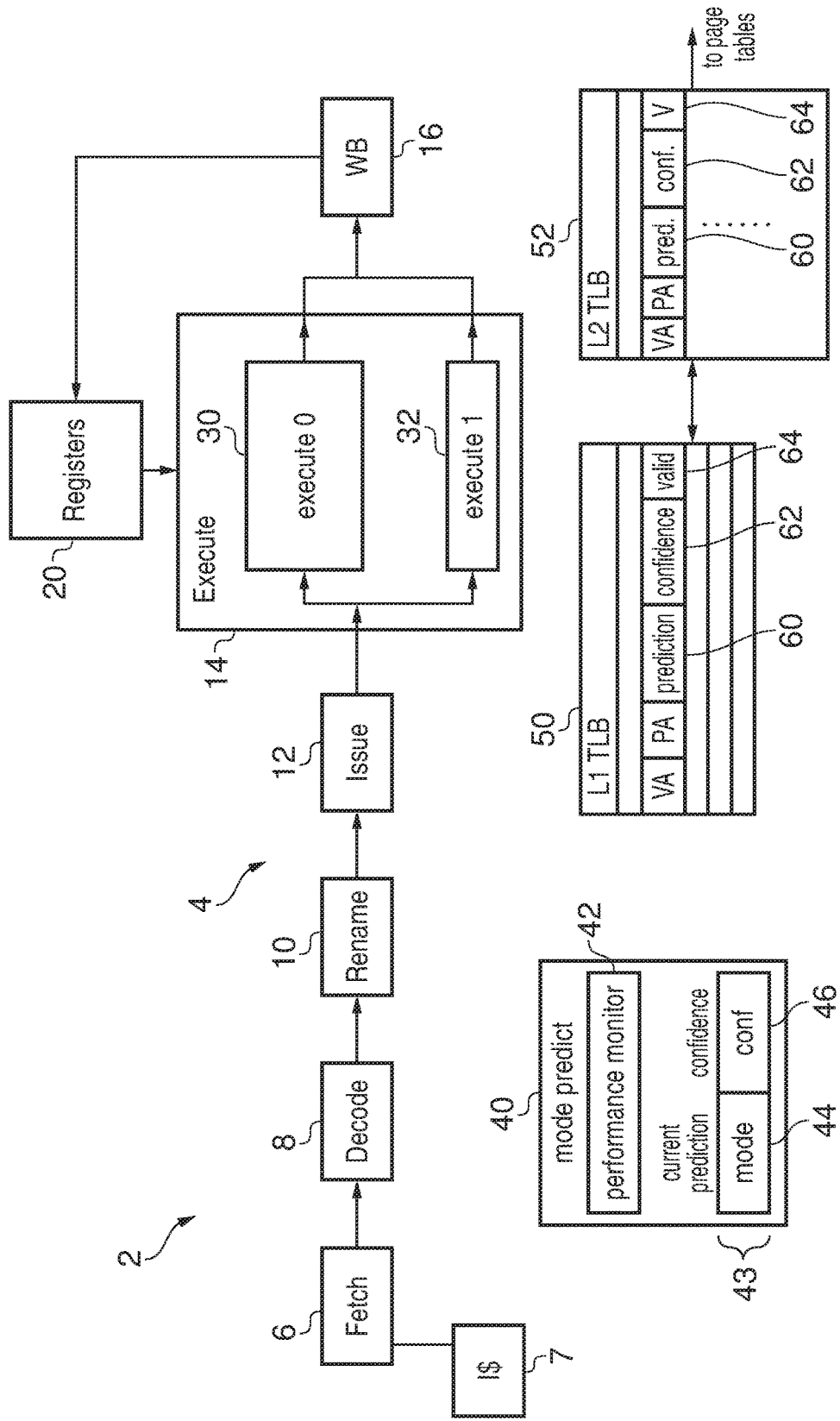

Some examples of the present technique will be discussed below.

In an apparatus having prediction circuitry for determining a predicted behaviour to be used when processing instructions, the predicted behaviour may be determined based on current prediction policy information which may be established based on an outcome of processing of instructions by the processing circuitry. For example the prediction circuitry may track the outcome of instructions and dynamically update the current prediction policy information so that subsequent instructions may be predicted to have similar outcomes to the previous instructions.

However, sometimes one type of predicted behaviour may be preferable for one block of instructions and then a following block of instructions may require a different predicted behaviour. On switching from the first block to the second block, the current prediction policy information may have been developed based on the first block and so may lead to inappropriate predictions for some time when starting to process the second block. It may take some time for the current prediction policy information to be updated in response to the outcome of instructions in the second block, and during this warm up period the prediction success rate may be reduced, which may affect performance or energy efficiency.

A storage structure can be provided for storing at least one entry which identifies previous prediction policy information for a corresponding block of instructions. In response to an instruction from a block of instructions for which the storage structure stores a corresponding entry which identifies the previous prediction policy information, the prediction circuitry may reset the current prediction policy information based on the previous prediction policy information identified in the corresponding entry. This enables previous prediction policy information to be saved and restored when a block of instructions is encountered again, to reduce the warm up time in updating the current prediction policy. This increases the likelihood that the prediction will be correct for the new block of instructions, and hence may improve performance or reduce energy consumption.

This technique can be applied to a range of types of predictions used in data processing systems. If there are two or more different prediction schemes then they could each use the technique discussed above.

For example, in some systems the processing circuitry may support a number of different processing modes with different performance or energy consumption characteristics. For example, there could be multiple execution units available for executing a given set of instructions, with the different processing modes using different execution units to execute the instructions. The processing modes could differ in terms of the number of instructions which can be processed in parallel, the maximum clock frequency supported, or the extent to which instructions may be executed out of order, for example. Unlike implementations which provide two entirely separate processor cores, by providing a single pipeline with two or more processing modes with different performance or energy consumption characteristics, the overhead of switching between the modes can be reduced and so it is possible to switch modes more frequently so that it becomes feasible to schedule shorter sequences of instructions in one mode or other to achieve higher performance gains or energy savings.

Prediction circuitry may be provided to predict which of the plurality of processing modes to use for processing a given set of instructions. Some sets of instructions (for example I/O bound workloads comprising a relatively large number of instructions which are dependent on long latency memory accesses) may not experience a significant difference in performance between the different processing modes since regardless of which mode is selected the level of performance achieved may be determined largely based on the latency of the memory access rather than the way in which the pipeline itself carries out processing. Other sets of instructions (for example compute bound workloads which include a large number of independent arithmetic or computation operations and fewer memory access operations) may experience a significantly higher performance in one processing mode than another. Hence, the prediction circuitry may predict which mode is best for a given set of instructions.

For example the prediction circuitry could monitor one or more performance metrics during processing of instructions and update the current prediction policy information depending on the performance metrics. For example the current prediction policy information may include an indication of which mode to use as well as a confidence indication indicating a confidence that the prediction would be correct. The previous prediction policy information stored in the storage structure could then indicate similar predictions which were previously made for a given block of instructions so that when those instructions are encountered again, the current prediction policy information can be reset to the previously determined prediction policy. When switching from a block of instructions for which one processing mode is preferred to a block of instructions better suited to another processing mode, there is no need to wait for the prediction mechanism to warm up by gradually updating the current prediction policy based on the measured performance metrics, since the previously determined prediction policy can be restored from the storage structure when the new block of instructions is encountered.

Another type of prediction may be a branch predictor for which the predicted behaviour may be a predicted outcome of a branch instruction. In this case the current prediction policy information could for example be the contents of a branch history buffer or table which provides data used to predict whether a branch is taken or not. This information may be dynamically updated based on the outcomes of resolved branch instructions. The previous prediction policy information stored in the storage structure need not directly identify the exact current prediction policy information to be restored, but could instead comprise an identifier of a particular way in which the current prediction policy information of the branch predictor is to be initialised when the corresponding block of instructions is encountered. For example, the previous prediction policy information could specify that certain types of branches should be biased towards being not taken or taken.

Another example of a prediction mechanism may be a data prefetcher which predicts which data to prefetch from a cache or memory. A data prefetcher may prefetch data to a cache from a further level cache or memory, in advance of any instruction actually requesting the data. This can exploit certain predictable patterns of data access which commonly arise in program code. For example, in some programs instructions may fetch data from the cache or memory in a certain stride pattern of addresses so that following fetching of data from a first address it is likely that more data will be fetched from another address differing from the first address by the stride amount. Hence, the current prediction policy information could be information specifying the predicted stride amount, or any other information which influences prefetcher behaviour. The previous prediction policy information may then indicate the way in which the current prediction policy information should be initialised when a given block of instructions is encountered, to reduce the warm up time when transitioning between sequences of instructions with different data access patterns.

Looking up the storage structure to check whether there is a corresponding entry for a current block of instructions, and resetting of the current prediction policy information if there is a corresponding entry with valid previous policy information, could occur at different stages of the pipeline.

However, in one example this may occur at a fetch stage for fetching instructions from an instruction cache or memory. When an instruction is fetched by the fetch stage which has a corresponding entry in the storage structure identifying previous prediction policy information, the current prediction policy information could be reset. Resetting the current prediction policy information to previous prediction policy information at the fetch stage can be preferable because the fetch stage is typically one of the earliest stages of the pipeline and so this approach allows the current prediction policy information to be reset soonest.

Not all blocks of instructions need to have an entry in the storage structure specifying the previous prediction policy information. For example, to reduce the overhead of tracking the previous prediction policy information, previous prediction policy information could be allocated to the storage structure for a block of instructions for which there is a change to the predicted behaviour determined based on the current prediction policy information. If the subsequent blocks continue with the same predicted behaviour despite any changes of current prediction policy information in response to the monitored outcome of instructions, they do not need to have previous prediction policy information stored. If an instruction is encountered for which there is no valid previous prediction policy information in the storage structure, then the current prediction policy information is not reset and may continue to be updated dynamically based on the outcomes of instructions.

In some cases the storage structure may be a dedicated structure for storing previous prediction policy information and in this case it may be that entries are only allocated to the structure when a particular block of instructions requires storage of some previous prediction policy information.

However, in other examples the storage structure for the previous prediction policy information may also store other information. For example, an existing storage structure for storing some other kind of information may be reused to also store the previous prediction policy information. If the storage structure also specifies other information, it can be useful to provide a valid indication indicating whether the previous prediction policy information of that entry is valid, to allow entries to be allocated for specifying the other information even if there is no previous prediction policy information to be specified for the corresponding block of instructions.

The previous prediction policy information for a given block of instructions may be recorded to the storage structure based on the current prediction policy information when a certain update condition is satisfied. It may be desirable to restrict the recording of previous prediction policy information to cases where there is a reasonably significant change in the predicted behaviour, to avoid constantly resetting the current prediction policy information.

For example, the prediction circuitry may maintain a confidence indication which indicates a level of confidence that a prediction based on the current prediction policy information is correct. The prediction circuitry may determine that the predetermined update condition is satisfied when the level of confidence indicated by the confidence indication exceeds a given threshold, and the current prediction policy information at the time the update condition is satisfied can then be used to set the previous prediction policy information for an entry corresponding to the current block of instructions being processed. This approach ensures that relatively weak predictions are not recorded in the storage structure until further monitoring of the outcomes of instructions increases confidence in the prediction.

Also, the update condition could be satisfied when the level of confidence exceeds the threshold and the predicted behaviour determined based on the current prediction policy information has changed since a preceding instance when the update condition was satisfied. For example, in some cases there may be several consecutive blocks of instructions which each require the same prediction but the confidence indication may fluctuate a little between more confident and less confident predications as there may be an occasional misprediction followed by more correct predictions. It may be undesirable to update the previous prediction policy information in the storage structure each time the level of confidence rises above the threshold as this may result in additional overhead in resetting the current prediction policy information each time one of these blocks of instructions is fetched. In practice, it may be sufficient just to set previous prediction policy information for the first of a series of blocks of instructions which requires a given predicted behaviour and then avoid updating the storage structure with previous prediction policy information until a different predicted behaviour has reached a sufficient level of confidence. For example, the change in predicted behaviour could be a change in the predicted mode of operation, change in whether branches are predicted taken or not, or a change in the predicted address stride or data prefetching pattern.

Some blocks of instructions may be easier to predict than others. For some blocks of instructions, the predicted behaviour may be consistently the same throughout the block of instructions and the same between successive attempts to execute the same block of instructions, in which case the technique discussed above of recording the previous prediction policy information in the storage structure and restoring it when instructions are encountered again can be very useful in order to reduce performance or energy penalty which may be occurred if waiting for the current prediction policy information to be warmed up based on outcomes of executing instructions.

However, for other blocks of instructions there may be some variation in the actual outcomes of instructions from time to time, which makes the predicted behaviour more likely to be incorrect. This may arise because the block size is too large to provide uniform behaviour across the whole block and there are several smaller code sequences within the block with different behaviours, or because the actual behaviour is data dependent and may change between different execution runs of the same code sequence. For such sequences of instructions, it may be preferred not to indicate a previous prediction policy in the storage structure and to rely simply on the dynamic updating of the current prediction policy based on outcomes of previous instructions, since the resetting of the current prediction policy to some previous prediction policy may not result in any performance or energy consumption gain and may in fact be counterproductive on some occasions, and so the overhead of storing and restoring this previous prediction policy information may not be justified. Therefore, the prediction circuitry may identify which blocks of instructions justify storage of previous prediction policy information and which ones do not.

One way of doing this may be to detect, when the predetermined update condition for updating the storage structure with prediction policy information is satisfied, whether the entry already has some valid prediction policy information set for the corresponding block of instructions. If the valid prediction policy information indicated in that entry is consistent with the information which would have been written to the storage structure based on the current prediction policy information, then this may indicate that this block of instructions is relatively predictable. However, when the existing previous prediction policy information indicates different information to the information that would have been set based on the current prediction policy information, then indicates that the block of instructions is less predictable since there is variation in the preferred prediction from time to time. Several approaches could be taken in this case. The previous prediction policy information of that entry could then be invalidated to prevent the current prediction policy information being reset based on unreliable information when that block is encountered again. Alternatively, a previous prediction confidence indication could be updated to reduce the level of confidence in the previous prediction policy information, and if the level of confidence drops below a threshold then the previous prediction policy information of that entry be invalidated. With this approach, an occasional misprediction can be tolerated but repeated misprediction will eventually lead to the previous prediction policy information being invalidated. With either of these approaches an entry for which the previous prediction policy information was invalidated could be marked with a flag to indicate that no further previous prediction policy information should be set for that entry, even if the update condition is satisfied. This prevents the previous prediction policy information being set later for a block determined to be relatively unpredictable.

As mentioned above, although a dedicated storage structure could be used for storing the previous prediction confidence indication, it may be more efficient to re-use existing structures. For example, the apparatus may have an instruction cache for caching instructions to be processed by the pipeline. A cache line which stores a certain block of instructions may be annotated with previous prediction policy information for resetting the current prediction policy when an instruction from that cache line is fetched.

However, a particularly useful structure to use for storing the previous prediction policy information can be a translation lookaside buffer (TLB) which has entries comprising address translation data for translating addresses within a corresponding page of addresses. Hence, the previous prediction policy information for instructions within the corresponding page can be stored in the corresponding TLB entry. The TLB has the advantage that it includes entries corresponding to relatively large page sizes (e.g. a 4K block of addresses or larger) which may often be a similar granularity to the sequences of code which exhibit similar predictive behaviour.

In some systems there may be a hierarchy of TLBs so that, for example, a first level TLB may provide quicker access to a smaller number of entries and the second TLB may store a larger number of entries but take longer to access. If an address within a certain page of addresses is required and the first level TLB does not store the required entry, then an entry can be requested from the second level TLB and allocated to the first level TLB for quicker access when other addresses of the same page are required. If none of the hierarchy of TLBs include an entry for a given page, then a page table walk may be performed to fetch the entry from page tables in memory.

The prediction circuitry may update the previous prediction policy information in the first level TLB. When an entry of the first level TLB is evicted then the corresponding entry in the second level TLB can be updated to include any previous prediction policy information specified in the evicted first level TLB entry. This allows previous prediction policy information to be retained beyond the time when a given TLB entry remains in the first level TLB, so that when that entry is later brought back into the first level TLB then the previous prediction policy information can be restored. Nevertheless, this approach reduces the overhead in tracking the previous policy information because the second level TLB only needs to be updated once on eviction of an entry from the first level TLB, not every time previous prediction policy information or other information such as a confidence indication is updated in the first level TLB.

Typically the TLBs may be part of the hardware microarchitecture of the data processing apparatus, but the page tables and memory may be visible to software executing on the apparatus. For example an operating system may set the page table information. In some cases the page tables may not include any previous prediction policy information. In this case, when an entry is evicted from the last level of the TLB hierarchy, then the previous prediction policy information would be lost and subsequent fetches of page table entries from the page table back into the TLB may start again assuming that there was no previous prediction policy information. Nevertheless, in such systems it is likely that entries will remain within the TLB hierarchy for sufficient time that the previous prediction policy information is useful.

In other implementations, the page tables may also include previous prediction policy information. In this case, on evicting an entry from the last TLB of the hierarchy, the corresponding page table entry in the page table is updated with the previous prediction policy information specified in the evicted entry. Then, when allocating a new entry to the TLBs from the page tables, the previous policy information is still known and can be used to warm up the predictor state before executing any instructions from that page of addresses. Hence, previous prediction policy may persist in the page tables even when entries are evicted from the TLBs.

FIG. 1 schematically illustrates an example of a data processing apparatus 2 having a processing pipeline 4 for processing instructions. The pipeline 4 includes various stages including a fetch stage 6, a decode stage 8, a rename stage 10, an issue stage 12, an execute stage 14 and a write back stage 16. Instructions move from stage to stage and processing of the instructions is pipelined so that while instructions are being processed at one stage other instructions may be processed at a different stage. It will be appreciated that this is just one example of a possible pipeline architecture and other examples may include different combinations or types of stages.

The fetch stage 6 fetches instructions from an instruction cache 7 or memory. The fetched instructions are passed to the decode stage 8 which examines the instruction opcode and any other information specified in the instruction and generates decoded instructions providing control information for controlling the operation of later stages. The decoded instructions are passed to the rename stage 10 which may perform register renaming for mapping architectural register specifiers specified by the instructions to physical register specifiers identifying physical registers 20 provided in hardware. Register renaming can enable data hazards to be avoided by mapping the same architectural specifier specified by two different instructions to different physical registers so that the two instructions can be executed in parallel or a different order. The renamed instructions are passed to the issue stage 12 which has an issue queue for queuing instructions awaiting issue for execution. For example instructions may remain within the issue stage 12 until their operands are available. The instructions are then issued to the execute stage 14 where the instructions are executed to carry out various processing operations such as arithmetic or logical operations or load/store operations to a cache or memory. In this example the registers 20 may be read in response to instructions executed at the execute stage 14, but it will be appreciated that in other examples the register reads could occur at a different stage such as the issue stage 12. The executed instructions are passed to the write back stage 16, which writes the results of the instructions to the register file 20.

In the example of FIG. 1, the processing pipeline 4 supports a number of different processing modes which have different performance or energy consumption characteristics. For example the execute stage 14 may include a first execute unit 30 and a second execute unit 32 which may execute substantially the same kinds of instructions but with different levels of performance or energy consumption. For example the first execute unit 30 may be able to process more instructions in parallel per processing cycle than the second execute unit 32. Also the first execute unit 30 may support techniques such as out-of-order processing which can help to improve performance by allowing execution of some instructions to proceed while other instructions are stalled awaiting the outcome of earlier instructions or a load or store from memory. In contrast, the second execute unit 32 may only support in-order processing, or could support less reordering of instructions in out-of-order execution. Also, the first execute unit 30 could support operating at a higher clock frequency than the second execute unit 32. While the first execute unit 30 may provide higher performance, the second execute unit 32 may consume less energy than the first execute unit 30 when executing a given set of instructions.

While FIG. 1 shows an example with two processing modes, it will appreciated that three or more modes could be provided with different performance or energy requirements. Hence, in general there are a number of processing modes in which one processing mode may be able to support a greater maximum throughput of instructions while another processing mode may achieve better energy efficiency than the first processing mode.

Some instructions may experience relatively little performance difference between modes. For other groups of instructions there may be a bigger performance difference. Hence, which mode is preferred may vary between blocks of instructions.

Mode prediction circuitry 40 is provided for predicting which mode is preferred for a given set of instructions. The mode predictor 40 includes performance monitoring circuitry 42 for monitoring performance metrics during the execution of instructions, such as indications of the throughput of instructions in a given timeframe, the number of load/store operations to memory, or any other parameter which reflects the performance achieved when executing instructions in one mode or other. The monitored performance metrics represent the outcome of previous mode predictions, and can be used to develop current prediction policy information 43 which is used to make the prediction for subsequent instructions. In this example, the current prediction policy information 43 includes a mode indicating value 44 specifying which mode should be predicted, and a confidence value 46 specifying a level of confidence that the prediction indicated by current prediction policy information 44 is correct. When the performance metrics indicate that the current prediction is successful (e.g. the higher performance mode was predicted and the metrics show that performance higher than a given threshold has been achieved), then confidence in the prediction can be increased, while when the performance metrics indicate a misprediction (e.g. the higher performance mode was predicted, but the performance metrics indicate lower performance than the threshold), then the confidence level indicated by the confidence value 46 can be reduced. When the confidence value 46 passes a predetermined threshold, then the predicted mode 44 can be switched so that the other mode is preferred.

While FIG. 1 shows an example where separate values 44, 46 are provided to indicate the predicted mode and confidence respectively, in other examples the current prediction policy information 46 may comprise a single value which indicates both the prediction to be made and the level of confidence. For example a simple two-bit counter could have a value 00 if there is a strong prediction that the first execute unit 30 should be used, a value 01 if there is a weak prediction that the first execute unit 30 should be used, a value 10 if there is a weak prediction that the second execute unit 32 should be used and a value 11 if there is a strong prediction that the execute unit 32 should be used. In this way as the performance monitoring circuit 42 tracks performance outcomes and determines whether it is more or less likely that the first or second execute unit 30, 32 should be used, the performance monitor 42 can increment or decrement the counter accordingly, and the predicted mode may be selected depending on whether the current value of the counter. The threshold at which the mode prediction switches in this example would be when the counter transitions between 01 and 10.

This is just one example. More generally, the current prediction policy information 43 may be updated dynamically based on the outcome of instructions executed by the pipeline 4 (in this case, the outcome being the performance metrics monitored during execution of such instructions rather than the result of the instructions). Within a sequence of instructions exhibiting relatively uniform behaviour, developing the current prediction policy information 43 dynamically by reinforcing correct predictions and correcting mispredictions can lead to a reasonable prediction success rate.

However, this sequence may then be followed by another sequence of instructions with different properties or requirements, and following the switch to the second sequence of instructions it may take some time for the current prediction policy information 43 to warm up sufficiently so that predictions start to be successful for the second sequence of instructions. During this warm up period, an inappropriate mode prediction may be made. This can limit performance or increase energy consumption.

To address this, blocks of instructions can be annotated with previous prediction information by reusing some entries of a translation lookaside buffer (TLB) 50 for storing address translation data. As shown in FIG. 1, a level one (L1) TLB includes a number of entries each corresponding to a page of virtual addresses. Each entry specifies a virtual page address VA identifying the corresponding page, and a physical page address PA to which the virtual page address is to be translated. When the processing pipeline 4 requires an address then a virtual address is provided to the level one TLB 50 and if the level one TLB includes a corresponding entry then it is used to translate the virtual address into a corresponding physical address which is returned to the pipeline 4 for accessing data in a cache or memory for example. In some cases the TLB entries may also include other kinds of information such as information specifying access permissions for controlling whether a certain process or privilege level is allowed to access data within the corresponding page.

If the TLB entry required for a given address is not present in the L1 TLB 50, then a request is sent to a level 2 (L2) TLB 52 which stores a larger set of TLB entries, and if the L2 TLB includes the required entry then it is allocated into the L1 TLB 50 which then responds to the address request in a similar way to the case when the L1 TLB 50 already included the required TLB entry. If necessary, an older entry of the L1 TLB 50 can be evicted to make space for the new TLB entry.

On the other hand, if the L2 TLB 52 does not contain the required TLB entry then a page table walk can be initiated to page tables in memory which store entries for all the pages of the virtual address space. The page tables in memory would normally be set by software such as by an operating system or hypervisor executed by the processing apparatus 2. While FIG. 1 shows a TLB architecture with two levels of TLB, it will be appreciated that other examples could have more than two levels.

As shown in FIG. 1, the L1 TLB entry for a given page of addresses can be annotated with previous prediction policy information 60, based on the current prediction policy information 43 which was developed for that page of addresses on a previous execution of instructions from that page. The TLB entry may also include a previous prediction confidence value 62 and a valid indication 64 as shown in FIG. 1. When the confidence value 46 indicates a sufficiently high level of confidence then the mode predictor 40 may update the L1 TLB entry 50 associated with the current page of instructions being executed, so that the previous prediction policy information 60 for that entry is set based on current mode 44 predicted by the mode predictor 40. Not all the TLB entries need have valid previous prediction policy information. Some entries may have the previous prediction policy information 60 set as invalid by clearing the valid bit 64.

On fetching an instruction at the fetch stage 6, the fetch stage 6 or the mode predictor 40 may check whether the L1 TLB 50 includes an entry with valid prediction policy information 60 for the corresponding page of addresses. If there is such an entry, then the mode predictor 40 may reset its current prediction policy information 43 based on the previous prediction policy 60 indicated in the L1 TLB entry. For example the previous prediction policy information 60 in this example may correspond to an indication of which mode to use for the corresponding page of addresses. Hence, on reading the L1 TLB entry, the mode predictor 40 can reset the current prediction indication 44, and optionally the confidence value 46, based on the prediction policy information 60 written in the L1 TLB entry. This resets the current prediction policy so that as soon as these instructions are fetched the processing mode which was previously determined to be preferred for those instructions can be selected immediately, rather than waiting for a period for the current prediction to be dynamically updated in response to the monitored outcome of executed instructions. This enables a better performance or energy efficiency balance by ensuring that the preferred mode is selected earlier.

In summary, with this scheme, a code sequence is initially run in either mode (based on whatever parameters the design uses to determine which mode to run in when no prediction is yet available). Once the mode predictor mechanism has warmed up and reached a sufficient level of confidence that either the current mode is the most optimal one, or has caused a switch to the other mode and waited to reach a sufficient level of confidence about the new mode, the first level TLB entry for the page containing the current program counter address is updated to record that a successful mode has been determined and what that mode is. This avoids the need to wait for the prediction mechanism to warm up each time the code sequence is executed, with the design executing in potentially a sub-optimal mode until then, as when instructions from the page are fetched subsequently, they can immediately begin executing the preferred mode. Only the first page containing the code sequence needs to be annotated in TLB, as the machine will then stay in the correct mode until it fetches another page with a different target mode indicated or the current prediction policy information 43 has changed dynamically in response to outcomes of instructions.

When a L1 TLB entry 50 is evicted to make space for another entry, then if the previous prediction policy information 60 has already been set then this can written to the L2 TLB 52 so that on a subsequent allocation of the same entry back into the L1 TLB 50 then the previous prediction policy information 60 will be retained. Similarly, on the eviction of entries from the L2 TLB it is possible to write the previous prediction policy information 60 to the page tables so that this information persists even if entries are removed from the TLB hierarchy as a whole.

The confidence value 62 in the TLB entries may be used to determine whether the previously set prediction policy information 60 is likely to be correct. The confidence value 62 may be set to a predetermined value when previous prediction policy information 60 is first written to the corresponding entry of the TLB. When the mode prediction circuitry 40 reaches sufficient level of confidence 46 that it should update the L1 TLB 50, it may check whether the previous prediction policy information 60 for the corresponding entry of the TLB has already been set valid as indicated by the valid bit 64 and if so, whether the prediction indicated by that TLB entry is consistent with the current prediction indicated by the mode bit 44. If these are consistent then this indicates that the same prediction is being made consistently for this block of instructions, and so the confidence level indicated by the confidence bit 62 of that TLB entry can be increased.

On the other hand, if when seeking to update the L1 TLB 50, the mode predictor 40 finds that valid prediction policy 60 is indicated in the corresponding TLB entry which is inconsistent with the current prediction indicated by the mode flag 44, then this may indicate that either the block size is too large to have a suitable mode determined for all of it, or the preferred mode may change between different execution runs of the same code sequence, and this may make the preferred mode hard to predict. To deal with this, the confidence level 62 indicated in that TLB entry can then be reduced, and if the confidence level becomes lower than a certain level then the previous prediction policy information 60 in that TLB entry can be invalidated by clearing the valid flag 64. The confidence bit is useful because it prevents occasional mispredictions from preventing the use of the previous prediction policy information in normal cases. Nevertheless, in other examples the confidence value 62 may not be provided, and the previous prediction policy 60 could be invalidated as soon as it is detected that it is inconsistent with a current prediction policy 44 of sufficient confidence for the same block of instructions.

Figure 2:
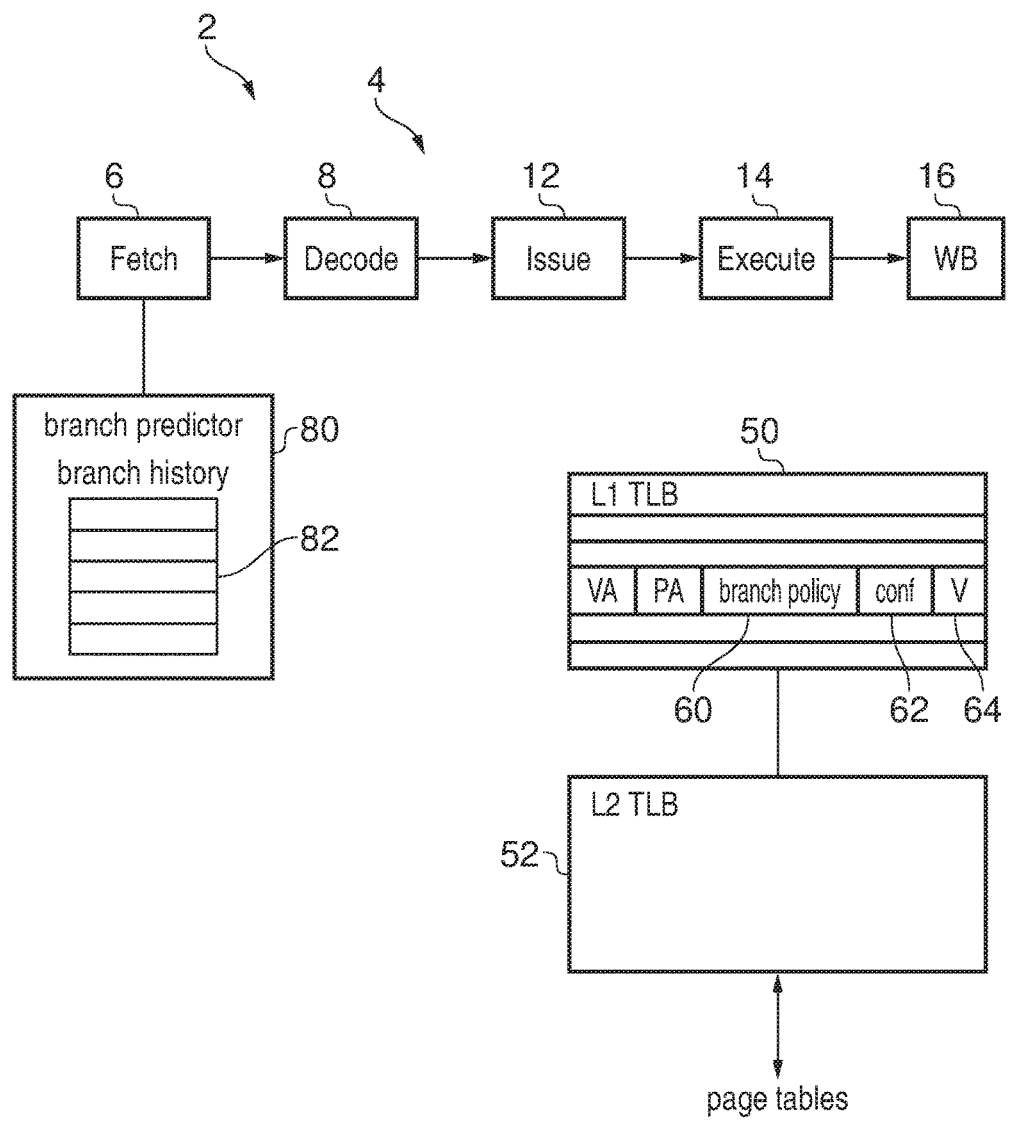
FIG. 2 shows an example of an apparatus having a branch predictor for predicting the outcomes of branch instructions.

FIG. 2 shows another example of prediction circuitry which may use a similar technique of tagging previous prediction policy information in the TLBs 50, 52. Again an example pipeline architecture 4 is shown. In this case no rename stage 10 is indicated, and the execute stage 14 executes instructions according to a fixed processing mode, rather than having multiple units 30, 32 with different performance/energy consumption characteristics as in FIG. 1. Otherwise, the pipeline is similar to FIG. 1. Alternatively, the branch prediction scheme discussed below could be applied to the pipeline of FIG. 1.

The pipeline includes a branch predictor 80 for predicting the outcomes of branch instructions based on branch history data stored in a branch history buffer 82. For example the branch history buffer 82 may include a number of entries corresponding to different types of branch instruction and each entry may include data indicating whether the corresponding type of branch should be taken or not taken and a confidence level indicating the likelihood of the prediction being correct. The branch history buffer 82 is updated dynamically based on the outcomes of resolved branches, to increase confidence in a prediction that was successful or reduce confidence in a prediction that was unsuccessful. Hence the branch history information 82 may represent current prediction policy information which is updated based on the outcome of executed instructions.

As in FIG. 1, when sufficient confidence is built up in a given branch prediction then corresponding policy information 60 can be stored to the corresponding L1 TLB entry for the current page of addresses being processed. On a subsequent fetch of instructions from the same page, the current branch history information 82 can be updated based on the previous branch policy 60 indicated in the corresponding TLB entry, to warm up the branch predictor 80. The branch policy information 60 stored as previous prediction policy information in the L1 TLB entry need not be in the same format as the branch history information 82 itself. For example the previous branch policy information 60 could simply be a value indicating how the branch history buffer 82 should be initialised. For example one value of the branch policy information 60 could indicate that branches should be biased as taken while another value could indicate that they should be biased as not taken, with the history buffer 82 being initialised accordingly. Otherwise the prediction functions is a similar way to FIG. 1 with branch policy information being updated in the L1 TLB initially and updated in the L2 TLB 52 when an L1 TLB entry is evicted.

Figure 3:
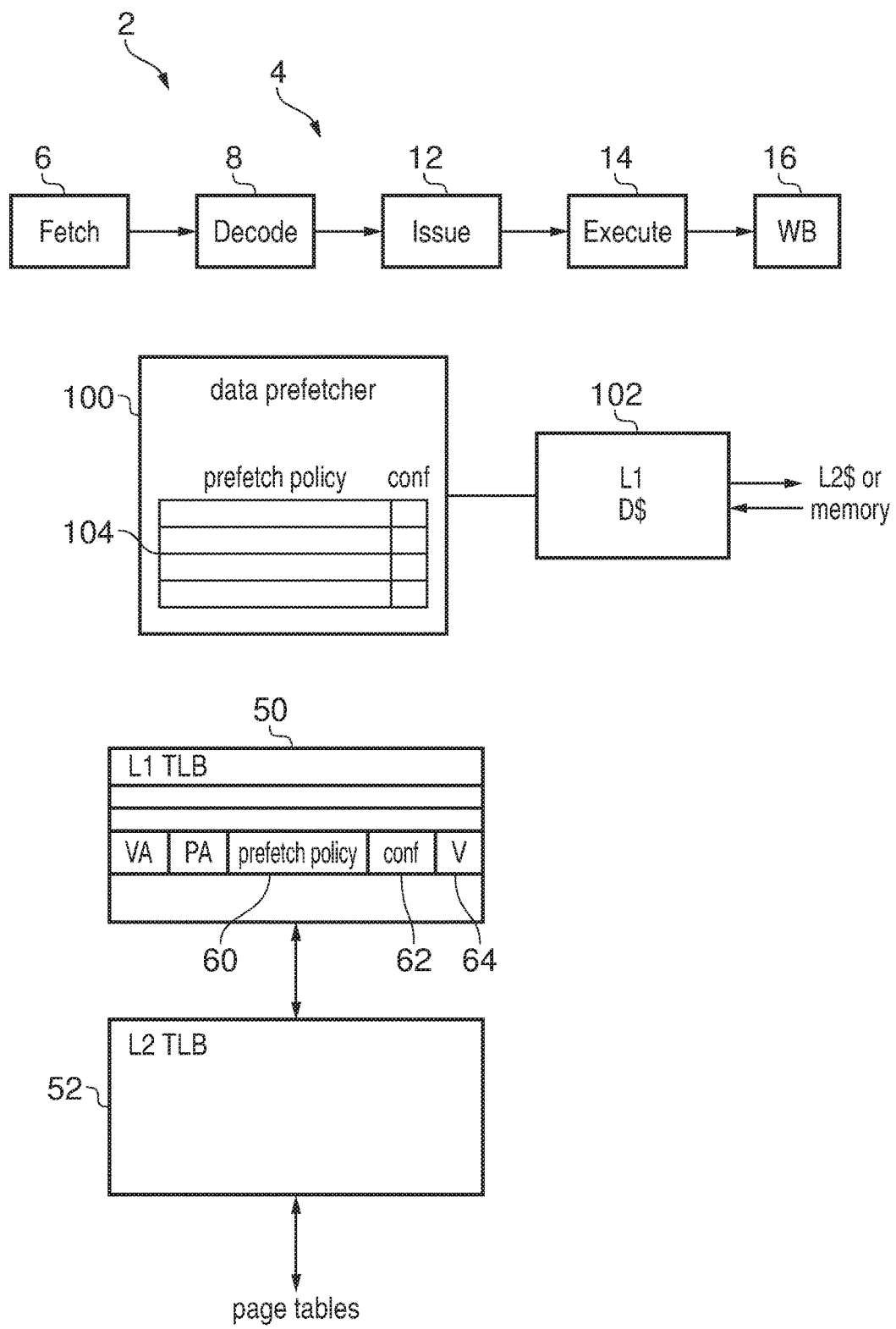
FIG. 3 shows an example of an apparatus having a data prefetcher for predicting which data to prefetch from a cache or memory.

FIG. 3 shows another example of a data processing apparatus 2 with a prediction mechanism which in this case is a data prefetcher 100 for prefetching data to a data cache 102 from a further level cache or memory in advance of the data actually being requested by instructions executed by the pipeline 4. For example it may be reasonably common for a series of instructions to step through fetching data from a series of addresses with a given stride increment between each successive address. The data prefetcher 100 may detect such patterns of data accesses and update current prefetch policy information 104 to indicate the detected stride and any other information associated with the prefetching such as mode information specifying the timing at which more data is to prefetched. As instructions are executed the data prefetcher 100 dynamically updates the current prefetch policy information 104 based on the observed patterns of access to memory. The current prefetch policy 104 is then used to predict which data to prefetch for subsequent instructions.

However, if there is a series of instructions which have a first stride pattern of accesses, followed by another sequence of instructions which use a different pattern, then following the switch there may be some loss in performance when the prefetch policy 104 has to be warmed up before the predictions start to achieve a performance gain. To avoid this warmup period, when a sufficiently high level of confidence in a predicted prefetch access pattern is reached, the L1 TLB 50 can be updated with prefetch policy information 60 which indicates how to initialise the data prefetcher 100 to provide the same prediction again later when instructions from the corresponding page of addresses are fetched, in a similar way to the examples of FIGS. 1 and 2.

While FIGS. 1 to 3 show an example where a TLB structure is used to record the previous prediction policy information, it would also be possible to use other structures. For example the instruction cache 7 could be annotated with previous prediction policy information 60 for a corresponding cache line of instructions. Alternatively, a dedicated structure could be provided solely for indicating the previous prediction policy information for corresponding blocks of instructions.

Also, in some cases the prediction mechanism 40, 80, 100 may track different predictions for different operating modes, contexts, threads of execution or groups of instructions, and in this case a number of separate current prediction policies may be developed, one for each mode, context, thread or instruction group. Therefore, there may also be multiple indications of previous prediction policy 60 in the corresponding TLB entry, or alternatively the TLB entry for a given page of addresses could specify which of the current prediction policies should be updated when an instruction from the corresponding page is fetched.

Figure 4:
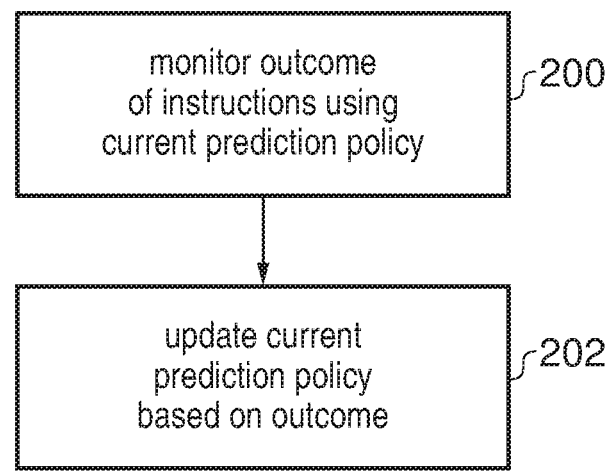
FIG. 4 shows a method of updating current prediction policy information based on the outcome of instructions.

FIG. 4 shows a method of updating current prediction policy. At step 200 the prediction circuitry 40, 80, 100 monitors an outcome of instructions being processed using the current prediction policy 44, 82, 104. For example the outcome could be the performance metrics monitored during execution of the instructions in the case of FIG. 1, or an indication of whether a branch prediction or data prefetch prediction was successful in the examples of FIG. 2 or 3. At step 202 the current prediction policy information is updated based on the monitored outcome at step 200. In general, if a previous prediction has been successful then the current prediction policy information can be updated to make it more likely that a similar prediction will be made again in future, while if the prediction was unsuccessful then the current prediction policy may be adjusted to make that prediction less likely.

Figure 5:
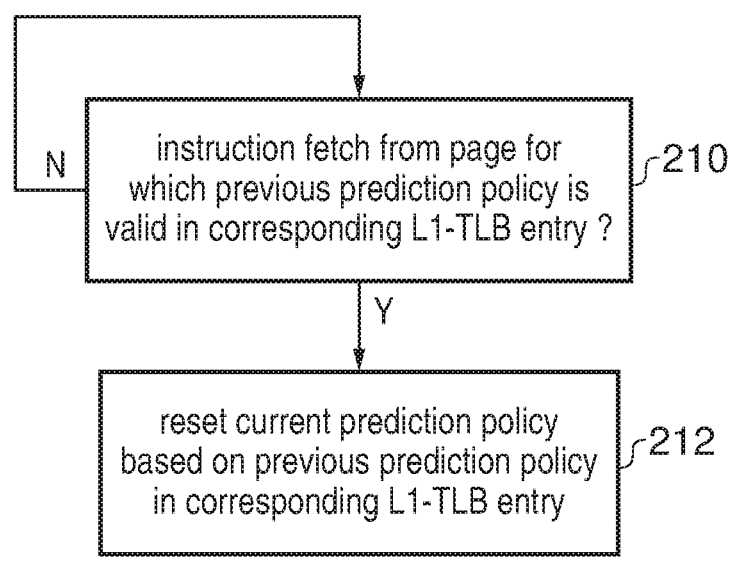
FIG. 5 shows a method of resetting current prediction policy information based on previous prediction policy information stored in a storage structure for a corresponding block of instructions.

FIG. 5 shows a method of restoring previous prediction policy information based on the L1 TLB 50. At step 210 the fetch stage 6 fetches an instruction from a given page of addresses. The mode predictor 40 may check whether the L1 TLB 50 for the corresponding page includes valid previous prediction policy information, as indicated by the valid flag 64. If not, then no change to the current prediction policy 44 is required, and predictions may continue using the current prediction policy which has been updated dynamically in response to the outcomes of instructions as shown in FIG. 4.

However, if an instruction is fetched from a page for which there is previous prediction policy information 60 which is indicated as valid in the corresponding L1 TLB entry, then at step 212 the current prediction policy information 44, 82, 104 is reset based on the previous prediction policy information 60 indicated in the corresponding TLB entry. For example the TLB entry could indicate which processing mode to use for the corresponding page of addresses, or could indicate a certain pattern of initialising the branch history buffer 82 or the prefetch stride pattern 104.

Figure 6:
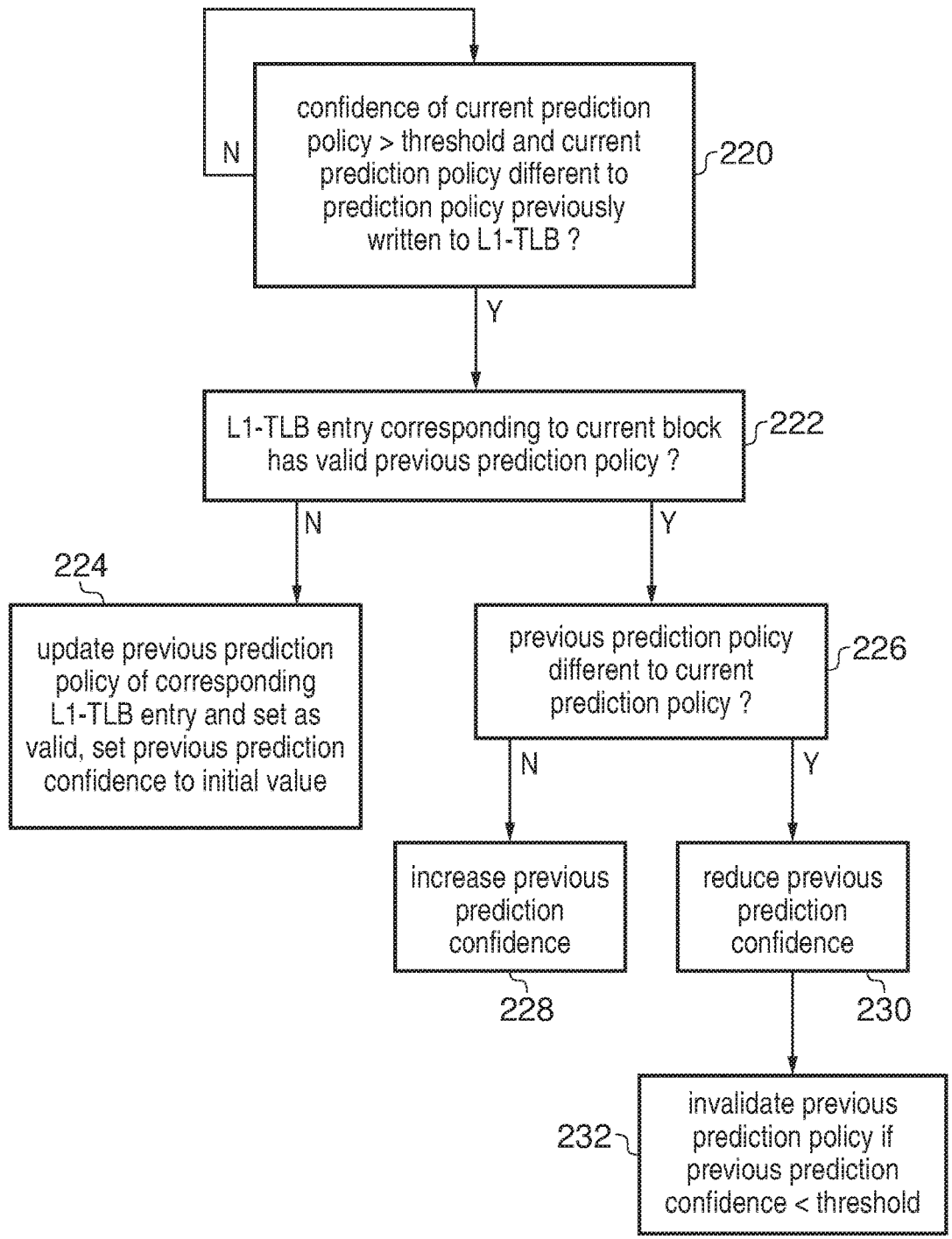
FIG. 6 shows a method of updating the previous prediction policy information stored in the storage structure for a corresponding block of instructions.

FIG. 6 shows a method of updating the previous prediction policy information for a current block of instructions. At step 220 the prediction circuitry 40, 80, 100 determines whether a confidence level for the current prediction policy is greater than a given threshold and whether the current prediction policy is different to the prediction policy when prediction policy information was previously written to the L1 TLB 50. For example, the most recent prediction information written to the L1 TLB 50 may be stored in a buffer within the predictor 40, 80, 100 and compared with the current prediction policy so that further annotations of prediction policy in the L1 TLB 50 only take place when there has been sufficient change in the current prediction policy. This reduces the overhead of tracking the previous prediction policy information by annotating only the first page of a given code sequence having different prediction requirements to preceding code.

If confidence has become sufficiently high and the current prediction policy is different to the information previously written to the L1 TLB 50, then at step 222 the mode predictor 40 determines whether the L1 TLB entry corresponding to the current block of instructions has valid previous prediction policy information. If not, then no previous prediction policy has been established for this page and so at step 224 the previous prediction policy information 60 of that L1 TLB entry is set based on the current prediction policy 43, 82, 104. The previous prediction confidence 62 is set to an initial value (which may indicate a greater level of confidence than the confidence threshold considered at step 232).

On the other hand, if at step 222, it is determined that the L1 TLB entry for the current block has some valid previous prediction policy information set, then at step 226 it is determined whether the valid previous prediction policy information 60 indicates a different predicted behaviour to the current prediction policy information. If not, then at step 228 the level of confidence indicated by value 62 is increased (if the confidence is not already at the maximum level). On the other hand, if the previous prediction policy 60 of the corresponding entry would provide a different prediction to the current prediction policy 43, 82, 104 then at step 230 the previous prediction confidence 62 is reduced and at step 232 the previous prediction policy information is invalidated if the previous prediction confidence 62 is now less than a threshold. Hence, an occasional misprediction will not cause the previous prediction policy 60 to be invalidated, but repeated predictions which differ from the previous prediction policy 60 will eventually cause invalidation of the previous prediction policy 60. Subsequent fetches of instructions from that block of addresses may then use the dynamic update mechanism to the current prediction information 44, 82, 104 rather than resetting the prediction information based on the information from the TLB.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
processing circuitry to process instructions;
prediction circuitry to determine, in dependence on current prediction policy information, a predicted behaviour to be used when processing instructions, and to update the current prediction policy information based on an outcome of processing of instructions by the processing circuitry;
a first storage structure to store the current prediction policy information; and
a second storage structure to store at least one entry identifying previous prediction policy information for a corresponding block of instructions, wherein when a predetermined condition is satisfied, the prediction circuitry is configured to set the previous prediction policy information of the entry of the second storage structure corresponding to a current block of instructions to one or more values selected in dependence on the current prediction policy information stored in the first storage structure; and
wherein in response to an instruction from a block of instructions for which the second storage structure stores a corresponding entry identifying the previous prediction policy information, the prediction circuitry is configured to reset the current prediction policy information stored in the first storage structure to one or more values selected based on the previous prediction policy information identified in the corresponding entry of the second storage structure.

2. The apparatus according to claim 1, wherein the processing circuitry has a plurality of processing modes with different performance or energy consumption characteristics; and
the predicted behaviour comprises a prediction of which of the plurality of processing modes to use for processing instructions.

3. The apparatus according to claim 2, wherein in one of said plurality of modes, the processing circuitry has a greater maximum throughput of instructions than in another of said plurality of modes.

4. The apparatus according to claim 1, wherein the predicted behaviour comprises a predicted outcome of a branch instruction.

5. The apparatus according to claim 1, wherein the predicted behaviour comprises a prediction of which data to prefetch from a cache or memory.

6. The apparatus according to claim 1, wherein the processing circuitry comprises a fetch stage to fetch instructions from an instruction cache or memory for processing by the processing circuitry; and
the prediction circuitry is configured to reset the current prediction policy information based on the previous prediction policy information in response to the fetch stage fetching an instruction from a block of instructions for which the second storage structure stores a corresponding entry identifying the previous prediction policy information.

7. The apparatus according to claim 1, wherein each entry of the second storage structure comprises the previous prediction policy information and a valid indication indicating whether the previous prediction policy information of that entry is valid; and
the prediction circuitry is configured to reset the current prediction policy information based on the previous prediction policy information in response to an instruction from a block of instructions for which the valid indication of the corresponding entry indicates that the previous prediction policy information is valid.

8. The apparatus according to claim 1, wherein the prediction circuitry is configured to maintain a confidence indication indicative of a level of confidence that a prediction based on the current prediction policy information is correct; and
the predetermined condition is satisfied when the level of confidence indicated by the confidence indication exceeds a predetermined threshold.

9. The apparatus according to claim 8, wherein the predetermined condition is satisfied when the level of confidence indicated by the confidence indication exceeds the predetermined threshold and the predicted behaviour determined based on the current prediction policy information has changed since a preceding instance when the predetermined condition was satisfied.

10. The apparatus according to claim 1, wherein in response to detecting that the predetermined condition is satisfied, when the entry corresponding to the current block of instructions already indicates valid previous prediction policy information which is different to the previous prediction policy information which would be set based on the current prediction policy information, the prediction circuitry is configured to invalidate the previous prediction policy information of the entry corresponding to the current block of instructions.

11. The apparatus according to claim 1, wherein said at least one entry comprises a previous prediction confidence indication indicative of a level of confidence that the previous prediction policy information of that entry is correct;

in response to detecting that the predetermined condition is satisfied, when the entry corresponding to the current block of instructions already indicates valid previous prediction policy information which is different to the previous prediction policy information which would be set based on the current prediction policy information, the prediction circuitry is configured to reduce the level of confidence indicated by the previous prediction confidence indication of that entry; and in response to the previous prediction confidence indication for an entry of the second storage structure indicating a level of confidence less than a predetermined threshold, the prediction circuitry is configured to invalidate the previous prediction policy information of that entry.

12. The apparatus according to claim 1, wherein the second storage structure comprises an instruction cache comprising at least one entry comprising a block of one or more instructions and the previous prediction policy information for that block of one or more instructions.

13. The apparatus according to claim 1, wherein the second storage structure comprises at least one translation lookaside buffer (TLB) comprising at least one entry comprising address translation information for translating addresses within a corresponding page of addresses and the previous prediction policy information for a block of instructions having addresses within the corresponding page.

14. The apparatus according to claim 13, wherein the second storage structure comprises at least a first level TLB and a second level TLB each for storing at least one entry comprising the address translation information and the previous prediction policy information;

wherein the prediction circuitry is configured to update the previous prediction policy information of an entry of the first level TLB; and the second level TLB is configured to update the previous prediction policy information of an entry of the second level TLB in response to eviction of the corresponding entry of the first level TLB.

15. The apparatus according to claim 14, wherein on allocating an entry to the first level TLB, when the corresponding entry of the second level TLB comprises the previous prediction policy information, the first level TLB is configured to write the previous prediction policy information of the corresponding entry of the second level TLB to the allocated entry of the first TLB.

16. The apparatus according to claim 13, comprising circuitry to update a page table entry of at least one page table with the previous prediction policy information when the corresponding entry is evicted from said at least one TLB.

17. The apparatus according to claim 16, wherein on allocating a new entry to said at least one TLB based on a corresponding page table entry of said at least one page table, when the corresponding page table entry comprises the previous prediction policy information, the at least one TLB is configured to write the previous prediction policy information of the corresponding page table entry to the allocated entry in the at least one TLB.

18. An apparatus comprising:
means for processing instructions;
means for determining, in dependence on current prediction policy information, a predicted behaviour to be used when processing instructions, and updating the current prediction policy information based on an outcome of processing of instructions by the processing circuitry;
first means for storing the current prediction policy information; and
second means for storing at least one entry identifying previous prediction policy information for a corresponding block of instructions, wherein when a predetermined condition is satisfied, the means for determining is configured to set the previous prediction policy information of the entry of the second means for storing corresponding to a current block of instructions to one or more values selected in dependence on the current prediction policy information stored in the first means for storing; and
in response to an instruction from a block of instructions for which the means for storing stores a corresponding entry identifying the previous prediction policy information, the means for determining is configured to reset the current prediction policy information stored in the first means for storing to one or more values selected based on the previous prediction policy information identified in the corresponding entry of the means for storing.

19. A method comprising:
determining, in dependence on current prediction policy information stored in a first storage structure, a predicted behaviour to be used when processing instructions;
updating the current prediction policy information based on an outcome of processing of instructions by the processing circuitry;
storing in a second storage structure at least one entry identifying previous prediction policy information for a corresponding block of instructions;
when a predetermined condition is satisfied, setting the previous prediction policy information of the entry of the second storage structure corresponding to a current block of instructions to one or more values selected in dependence on the current prediction policy information stored in the first storage structure; and
in response to an instruction from a block of instructions for which the second storage structure stores a corresponding entry identifying the previous prediction policy information, resetting the current prediction policy information stored in the first storage structure to one or more values selected based on the previous prediction policy information identified in the corresponding entry of the second storage structure.

* * * * *